United States Patent
Ishihara et al.

(10) Patent No.: US 6,992,738 B2
(45) Date of Patent: Jan. 31, 2006

(54) LIQUID CRYSTAL DISPLAY DEVICE INCLUDING AN ELECTRODE CONSTITUTING PIXEL ELECTRODE CONNECTED TO ANOTHER ELECTRODE THROUGH OPENING FORMED IN COLOR FILTER

(75) Inventors: Katsuyoshi Ishihara, Mobara (JP); Tatsuo Hamamoto, Mobara (JP)

(73) Assignee: Hitachi Displays, Ltd., Tokyo (JP)

( * ) Notice: Subject to any disclaimer, the term of this patent is extended or adjusted under 35 U.S.C. 154(b) by 79 days.

(21) Appl. No.: 10/617,755

(22) Filed: Jul. 14, 2003

(65) Prior Publication Data

US 2004/0051829 A1 Mar. 18, 2004

(30) Foreign Application Priority Data

Jul. 15, 2002 (JP) ........................ 2002-205768

(51) Int. Cl.
*G02F 1/1335* (2006.01)
*G02F 1/1343* (2006.01)

(52) U.S. Cl. ........................ 349/106; 349/147
(58) Field of Classification Search ........... 349/42, 349/43, 106, 147
See application file for complete search history.

(56) References Cited

U.S. PATENT DOCUMENTS

| 6,031,512 A | 2/2000 | Kadota et al. | 345/88 |
| 6,697,138 B2 * | 2/2004 | Ha et al. | 349/114 |
| 6,727,964 B2 | 4/2004 | Tanaka et al. | 349/106 |
| 2002/0033912 A1 * | 3/2002 | Tanaka et al. | 349/106 |
| 2003/0043318 A1 * | 3/2003 | Kim | 349/106 |

FOREIGN PATENT DOCUMENTS

| JP | 11-24061 | 6/1997 |
| JP | 2002-40485 | 7/2000 |

* cited by examiner

*Primary Examiner*—Tarifur R. Chowdhury

(57) ABSTRACT

In a liquid crystal display device includes a pair of substrates between which a liquid crystal layer filled, a plurality of pixel regions each of which includes a pixel electrode and an active element connected to the pixel electrode on a main surface of one of the pair of substrates, the present invention provides a first electrode layer electrically connected to the active element, a color filter layer formed over the first electrode layer and having an opening portion, and a second electrode layer covering the color filter layer, and utilizes the second electrode layer as the pixel electrode by connecting the second electrode layer to the first electrode layer electrically through the opening portion of the color filter layer. Since the liquid crystal display device according to the present invention allows light incident on the liquid crystal layer partially to pass through the opening portion of the color filter layer in each of the pixel regions, the luminance of the displayed image is increased without deteriorating the contrast.

13 Claims, 13 Drawing Sheets

LIQUID CRYSTAL DISPLAY DEVICE INCLUDING AN ELECTRODE CONSTITUTING PIXEL ELECTRODE CONNECTED TO ANOTHER ELECTRODE THROUGH OPENING FORMED IN COLOR FILTER

BACKGROUND OF THE INVENTION

1. Field of the Invention

The present invention relates to a liquid crystal display device, and more particularly to a liquid crystal display device which has color filter layers on a substrate on which active elements are formed.

2. Description of the Related Art

As a liquid crystal display device which is capable of performing color display of high definition served for a notebook type computer, a computer monitor or a television receiver set, an active matrix type liquid crystal display device has been popularly used. This type of liquid crystal display device includes a so-called liquid crystal panel which substantially sandwiches a liquid crystal layer between two sheets of substrates at least one of which is formed of a transparent substrate such as a glass plate or the like. On a periphery of the liquid crystal panel, drive circuits (drive ICs) and wiring and the like are mounted or formed. Further, the liquid crystal panel is combined with a control circuit board and, when necessary, an auxiliary illumination device such as a backlight to form a liquid crystal display device. Hereinafter, even when the explanation relates to the constitution of the liquid crystal panel per se, the explanation is made as that of the liquid crystal display device for convenience's sake.

There has been known a so-called vertical electric field type (TN type) liquid crystal display device, wherein active elements such as thin film transistors, thin film diodes or the like and pixel electrodes driven by the active elements are formed on one substrate (referred to as "first substrate" hereinafter) of the liquid crystal display device and common electrodes which form an electric field for driving liquid crystal between the common electrodes and the pixel electrodes are formed on another substrate (referred to as "second substrate" hereinafter) of the liquid crystal display device. As the literature which discloses this type of active matrix type liquid crystal display device, JP-A-63-309921 can be named, for example.

On the other hand, a so-called lateral electric field type (IPS type) liquid crystal display device which forms the above-mentioned common electrodes on the first substrate side and sets the direction of an electric field applied to a liquid crystal layer arranged substantially parallel to a surface of the substrate has been put into practice. As literatures which disclose this IPS type liquid crystal display device, JP-B-63-21907 and the like which aim at the acquisition of an extremely wide viewing angle using comb-teeth electrodes at one of two substrate can be named.

In the above-mentioned respective types of liquid crystal display devices, color filter layers in three colors are provided to the first substrate or the second substrate for performing the full color display. Although a type of structure which forms these color filter layers at the second substrate side has been well known, there also exists a type of structure which forms the color filter layers on the first substrate side. In both types, the color display is obtained by performing the color modulation of light which passes the liquid crystal layer sandwiched between the pixel electrodes selected by the active elements and the common electrodes by the color filter layers.

In general, the first substrate is also referred to as "the active matrix substrate" since the active matrix elements such as thin film transistors for driving pixels are arranged thereon in a matrix array. Hereinafter, the explanation is made by calling the first substrate as the active matrix substrate and the active elements as thin film transistors. The method which forms the color filter layers on the active matrix substrate has an advantage that a step for overlapping the active matrix substrate and the second substrate which are arranged to face each other in an opposed manner is facilitated. Hereinafter, the second substrate is referred to as the counter substrate.

SUMMARY OF THE INVENTION

The active matrix substrate forms a large number of thin film transistors on the substrate in a matrix array and forms a first electrode layer on a drive terminal (output terminal) of each thin film transistor. In the type which forms the color filter layers on the counter substrate side, the first electrode layers constitute pixel electrodes. However, in the liquid crystal display device of the present invention, the color filter layers are formed such that the color filter layers cover the first electrode layers, second electrode layers which are members different from the first electrode layers are formed above the color filter layers, and the second electrode layers are electrically connected to the first electrode layers and constitute pixel electrodes.

In embodiments explained later, the explanation is made assuming that all of the first electrode layers, the second electrode layers, and common electrodes which are formed on the counter substrate are made of ITO (indium tin oxide). However, other transparent conductive films made of IZO (indium zinc oxide) and the like can be also used. Regions in which respective thin film transistors are arranged are referred to as pixel regions and color filter layers are applied to these pixel regions. Then, the second electrode layers which constitute the pixel electrodes are formed such that the second electrode layers cover the color filter layers. Here, it is necessary to electrically connect the second electrode layers to the first electrode layers.

In this type of conventional liquid crystal display device which adopts the color-filter-integral-type active matrix substrate, after forming the color filter layers, contact holes are formed in drive output portions of the thin film transistors and the electrode layers (pixel electrodes) which are arranged above the color filter layers and the drive output portions of the thin film transistors are electrically connected to each other through these contact holes. Further, although the electric connection between the first substrate and the second substrate can be established at portions excluding the pixel regions, the constitutional layers of the thin film transistor, wiring for applying various signals for driving the thin film transistors and the like are present at portions excluding the pixel regions and hence, the film surface is irregular in many cases. Accordingly, there exists a limit with respect to the enhancement of the reliability of connection between the electrode layers (pixel electrodes) and the drive output portions of the thin film transistors. Further, conventionally, after forming the color filter, it is necessary to adopt particular manufacturing process. That is, photolithography steps including a step for forming contact holes or the like are increased in number. Accordingly, there arises a drawback that the number of manufacturing steps is increased compared to a so-called color filter separation type which forms the color filter layers on the counter substrate side. This drawback constitutes one of tasks to be solved.

Accordingly, it is an object of the present invention to provide a liquid crystal display device which can be manufactured at low cost and can exhibit the high reliability by overcoming the above-mentioned drawbacks of the prior art. That is, the present invention can obtain a color-filter-integral type active matrix substrate without changing manufacturing steps of a conventional active matrix type substrate for a color-filter-separation-type liquid crystal display device.

To achieve the above-mentioned object, according to the present invention, first electrode layers made of a conductive thin film which are electrically connected to drive output terminals of active elements are formed on respective pixel region of a first substrate which constitutes an active matrix substrate, color filter layers having opening portions which are partially formed therein or exposing portions which expose portions of the first electrode layers at end peripheries thereof are formed on respective pixel regions. Further, second electrode layers which constitute pixel electrodes are formed such that the second electrode layers cover the color filter layers. Due to such a constitution, the second electrode layers are electrically connected to the first electrode layers through the above-mentioned opening portions or exposing portions. The first electrode layers have the structure equivalent to the structure of the conventional color-filter-separation-type active matrix substrate and constitute pixel electrodes in the color filter separation type.

Accordingly, up to a step prior to formation of the color filter layers, the conventional manufacturing process of the color-filter-separation-type active matrix substrate can be used without any modification. Further, the alignment of the active matrix substrate with the counter substrate is facilitated whereby the throughput is enhanced and the reduction of cost can be realized. Further, electric connection portions of the first electrode layers and the second electrode layers are arranged at pixel regions and hence, both electrode layers can be connected with high accuracy whereby the reliability is enhanced.

Further, by providing spacers which restrict a gap between the active matrix substrate and the counter substrate to the above-mentioned electric connection portions, leaking of light can be suppressed. Further, by providing light shielding layers to portions of the counter substrate corresponding to the opening portions or the exposing portions of the color filter layers, a contrast can be enhanced although the numerical aperture is decreased.

The present invention is not limited to the above-mentioned constitutions or the constitutions of embodiments described later and it is needless to say that various modifications are conceivable without departing from the technical concept of the present invention.

DETAILED DESCRIPTION

Figure 1:
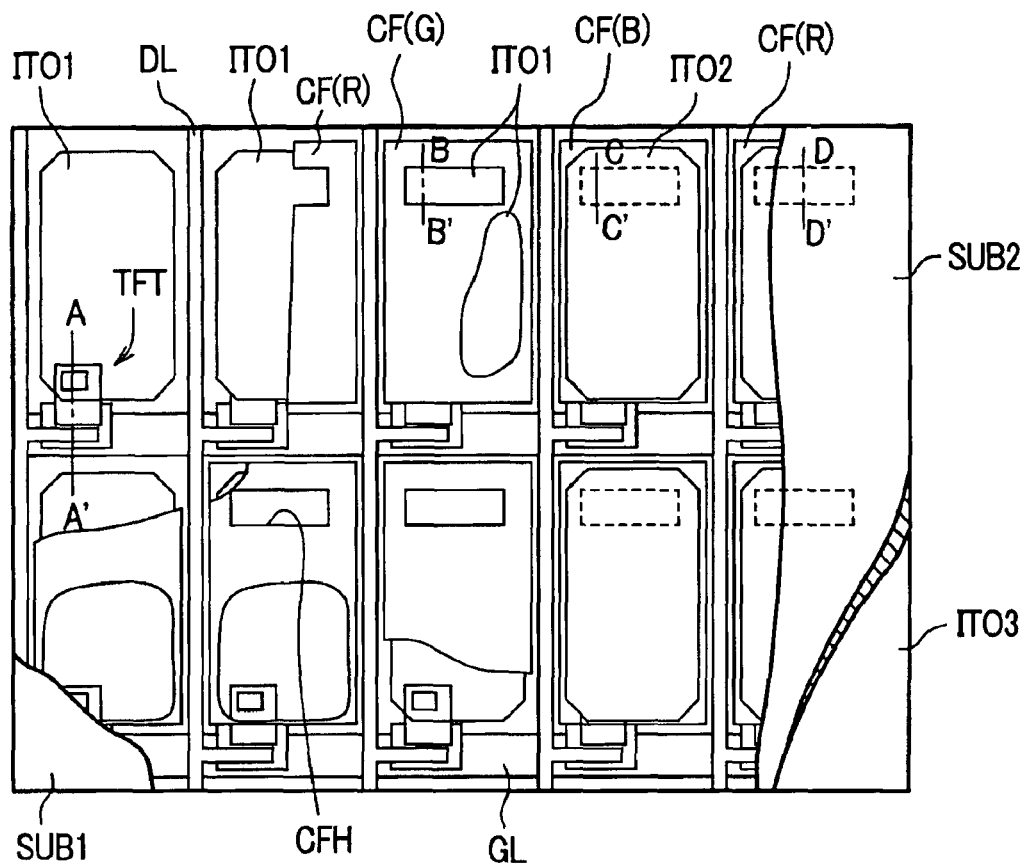
FIG. 1 is a plan view of pixel portions which constitute a liquid crystal display device of the present invention.

Embodiments of the present invention are explained in detail hereinafter in conjunction with drawings which show the embodiments. FIG. 1 is a plan view of pixel portions which constitute a liquid crystal display device of the present invention. To facilitate the understanding of the present invention, the liquid crystal display device is shown with portions of respective constitutional layers broken or cut away. Further, FIG. 2 to FIG. 5 are cross-sectional views respectively taken along a line A–A', a line B–B', a line C–C' and a line D–D' in FIG. 1. Here, in the embodiment described hereinafter, the explanation is made with respect to an example in which thin film transistors are used as active elements. In respective drawings, reference symbol SUB1 indicates an active matrix substrate which constitutes a first substrate, reference symbol SUB2 indicates a second substrate (counter substrate), and reference symbol TFT indicates a thin film transistor which drives a unit pixel.

Figure 2:
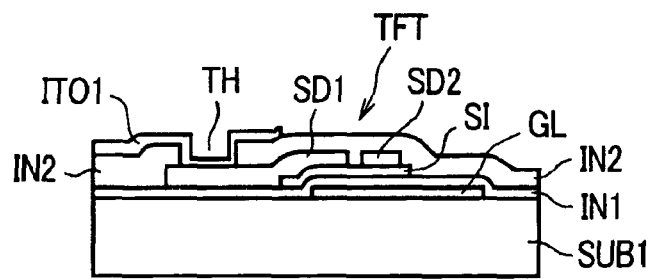
FIG. 2 is a cross-sectional view taken along a line A–A' in FIG. 1.
Figure 3:
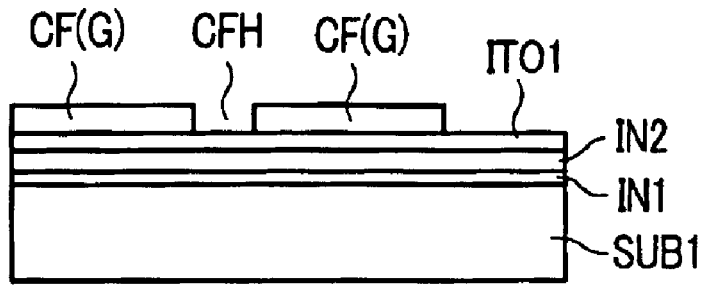
FIG. 3 is a cross-sectional view taken along a line B–B' in FIG. 1.
Figure 4:
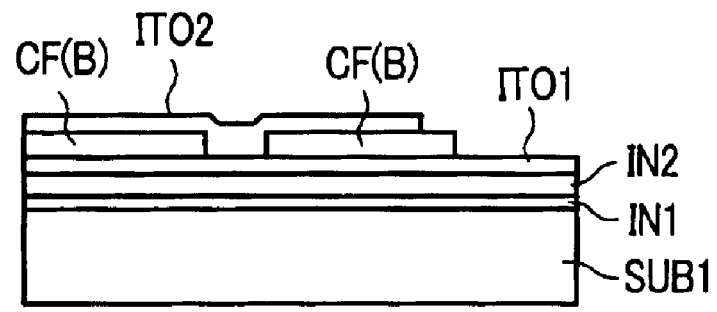
FIG. 4 is a cross-sectional view taken along a line C–C' in FIG. 1.
Figure 5:
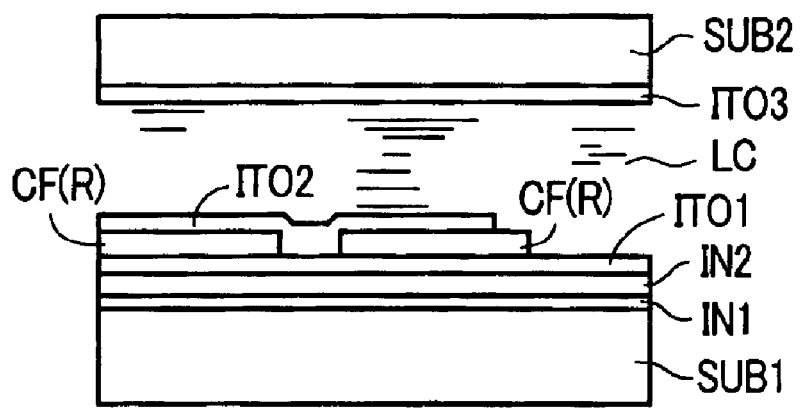
FIG. 5 is a cross-sectional view taken along a line D–D' in FIG. 1.

On an inner surface of the active matrix substrate SUB1, one unit pixel which constitutes one pixel in a monochromatic display or each unit pixel of red (R), green (G), blue (B) which constitute color 1 pixel in a color display is formed in a region (pixel region) which is surrounded by two data lines (hereinafter referred to as drain lines) DL and two scanning lines (hereinafter referred to as gate lines) GL. The thin film transistor TFT which performs ON/OFF driving of the unit pixel is formed at one corner of the pixel region. FIG. 2 to FIG. 4 show steps for forming the thin film transistors TFT, the pixel electrodes and the like on the active matrix substrate SUB1, wherein FIG. 5 shows a state in which the counter substrate SUB2 is laminated to the active matrix substrate SUB1 and a liquid crystal layer is filled in the inside defined between these substrates.

In FIG. 2, a portion of the gate line GL constitutes a gate electrode of the thin film transistor TFT. A semiconductor layer SI is formed in a desired pattern on the gate electrode by way of a first insulation layer IN1. On this semiconductor layer SI, a metal film made of aluminum, chromium, molybdenum or other metal is formed and a source electrode SD1 and a drain electrode SD2 are formed by patterning. Then, a second insulation layer IN2 is formed over these components. A contact hole TH is formed in the second insulation layer IN2, a conductive layer which is preferably made of indium tin oxide is formed through the contact hole TH by vapor deposition or the like, and a first electrode layer ITO1 which is electrically connected with the source electrode SD1 is formed substantially over the whole area for each pixel region (see FIG. 1).

Then, color filter layers of respective colors are applied to the inner surface of the active matrix substrate SUB1 such that the color filter layers cover the first electrode layer ITO1 within the pixel region. FIG. 3 is a cross-sectional view taken along a line B–B' in FIG. 1. The color filter layer CF(G) of green(G) is formed in this pixel. Here, an opening portion CFH is formed in a portion of the color filter layer. Inside the opening portion CFH, the first electrode layer ITO1 which is disposed below the opening portion CFH is observed.

Next, as shown in FIG. 4, a second data layer ITO2 is formed over the inner surface of the active matrix substrate SUB1 by vapor deposition or the like such that the second data layer ITO2 covers the color filter layers CF. FIG. 4 is a cross-sectional view of a portion of the blue phosphor layer CF (B) provided for the unit pixel as one of the color filter layers CF. As shown in the drawing, the second electrode layer ITO2 is electrically connected to the first electrode layer ITO1 through the opening portion CFH of the color filter layer CF. The second electrode layer ITO2 constitutes the pixel electrode. Thereafter, an orientation film is formed over the second electrode layer ITO2 thus completing the active matrix substrate. Here, the orientation film is omitted from the drawing.

FIG. 5 is a cross-sectional view taken along a line D–D' in FIG. 1 showing a state that the second substrate sub2 which constitutes the counter substrate having common electrodes ITO3 is laminated to the active matrix substrate manufactured in the above mentioned manner by way of the liquid crystal layer CL.

In the liquid crystal display device of this embodiment, the orientation of the liquid crystal layer CL is controlled in response to an electric field which is generated between the second electrode layer ITO2 which constitutes the pixel electrode over the color filter layer CF formed at the active matrix substrate side and the common electrode ITO3 formed over the counter substrate SUB2 and hence, respective unit pixels having given colors are driven whereby the image display is performed. When an area ratio of the opening of the opening portion CFH formed in the color filter layer CF is excessively large, the degradation of hue becomes apparent and hence, it is preferably to set the magnitude of the area ratio to 1% to 20%. This area ratio may be determined by taking performances requested in view of display quality such as the size of a liquid crystal panel, a type of electronic equipment on which the liquid crystal display device is mounted into account.

According to this embodiment, different from the prior art, it is unnecessary to form a contact layer for electrically connecting the source electrode SD1 (or the drain electrode SD2) which is formed of the metal layer and the transparent electrode ITO which constitutes the pixel electrode and is made of indium tin oxide. Accordingly, the process for forming such a contact layer is not necessary. Further, the active matrix substrate SUB1 can directly adopt the manufacturing process of the conventional color-filter-separation-type active matrix substrate without modification and hence, no new manufacturing facilities are necessary.

Further, since the electrical connection between the first electrode layer ITO1 and the second electrode layer ITO2 is performed in the inside of the pixel region, the gate lines and the drain lines are present outside the pixel region, whereby a film surface is irregular and there exist limits with respect to the size and the position of the contact hole. According to this embodiment, since the contact hole TH is not formed in such a portion, the electric connection of the first electrode layer ITO1 and the second electrode layer ITO2 can be performed easily and surely whereby the reliability is enhanced.

Further, according to this embodiment, since the first electrode layer ITO1 and the second electrode layer ITO2 which are both made of transparent material are directly connected, the reliability of the connection is enhanced and, at the same time, lowering of the numerical aperture can be prevented whereby the bright image display can be obtained.

Figure 6:
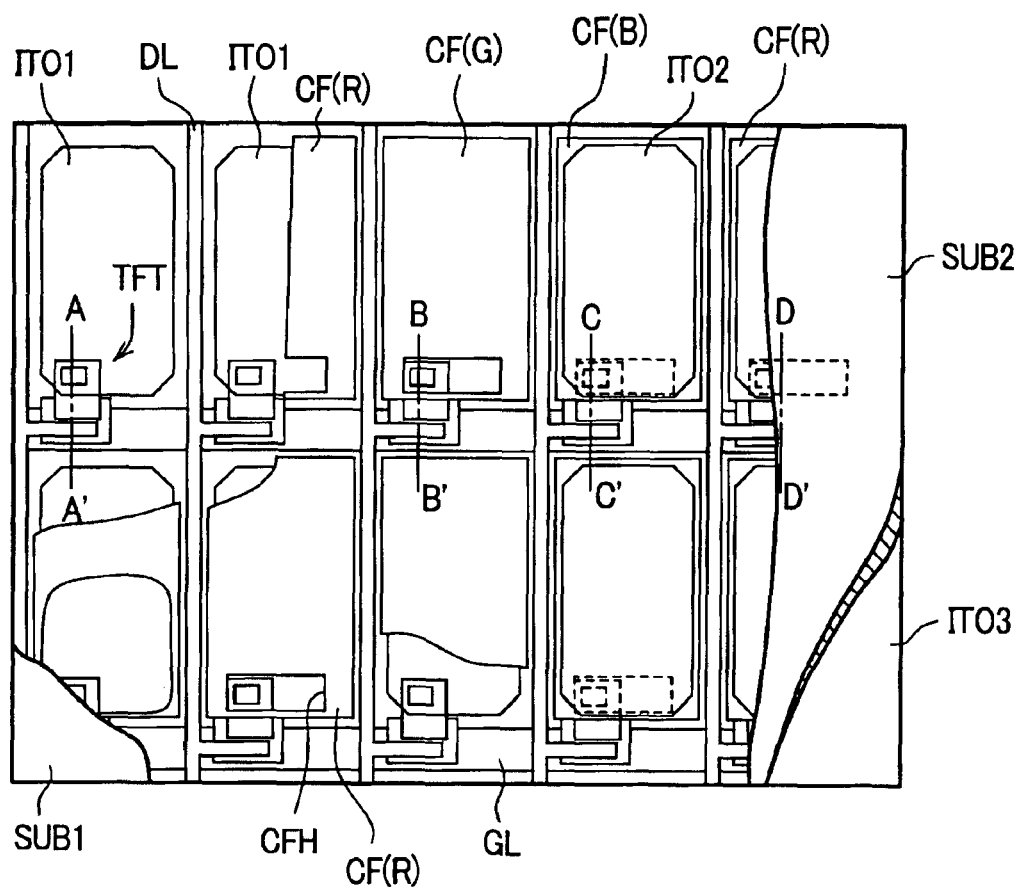
FIG. 6 is a plan view of pixel portions similar to the pixel portions in FIG. 1 for explaining the second embodiment of the present invention.
Figure 7:
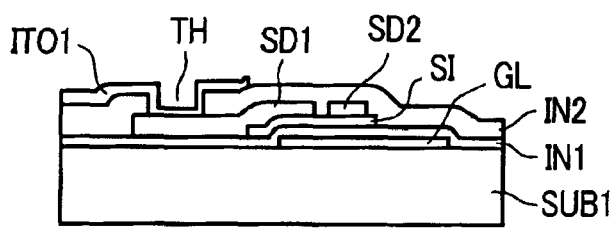
FIG. 7 is a cross-sectional view taken along a line A–A' in FIG. 6.

FIG. 6 is a plan view of a pixel portion similar to the pixel portion shown in FIG. 1 for explaining the second embodiment of the present invention. Further, FIG. 7 to FIG. 10 are cross-sectional views taken along a line A–A', a line B–B', a line C–C' and a line D–D' in FIG. 6. In this embodiment, as shown in FIG. 7, steps up to the formation of the first electrode layer ITO1, that is, the steps in which the thin film transistor TFT is formed over the active matrix substrate SUB1 and the first electrode layer ITO1 which is connected to the source electrode SD1 of the thin film transistor TFT1 is formed are equal to those of the first embodiment and hence, their repeated explanation is omitted. This embodiment is characterized in that the position of the opening portion CFH formed in the color filter layer CF which is formed over the first electrode layer ITO1 is arranged right above the source electrode SD1 of the thin film transistor TFT and at a portion which includes a connection portion between the first electrode layer ITO1 and the source electrode SD1.

A portion of the source electrode SD1 of the thin film transistor TFT is a portion which does not contribute to the optical transmission of the color filter layer in the pixel region. Accordingly, by forming the opening portion CFH of the color filter layer CF at the portion including the source electrode SD1, the degradation of hue attributed to the opening portion CFH can be reduced. FIG. 7 to FIG. 10 show the similar constitutions except for the position of the opening portion CFH formed in the color filter layer CF. Further, other advantages of this embodiment are equal to those of the first embodiment and hence, their repeated explanation is omitted.

Figure 11:
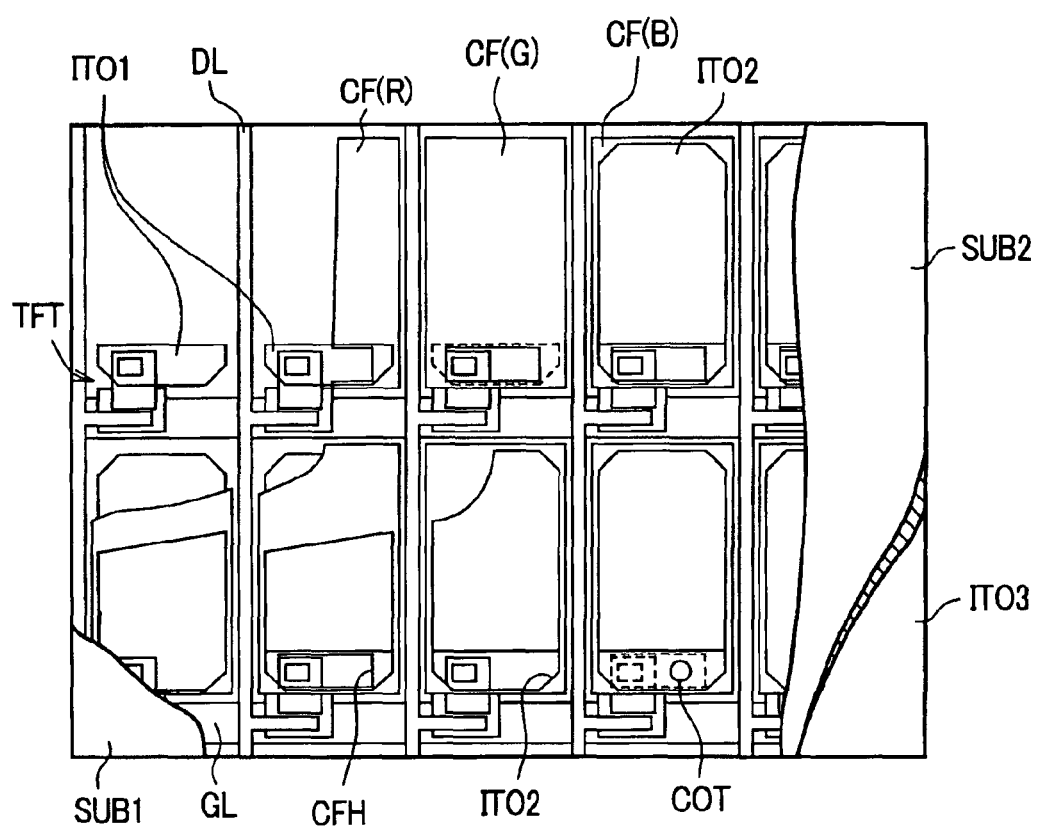
FIG. 11 is a plan view of pixel portions similar to the pixel portions in FIG. 1 and FIG. 2 for explaining the third embodiment of the present invention.

FIG. 11 is a plan view of a pixel portion similar to the pixel portions shown in FIG. 1 and FIG. 2 for explaining the third embodiment of the present invention. This embodiment is characterized by limiting the position of the first electrode layer ITO1 which is connected to the source electrode SD1 of the thin film transistor TFT only to the vicinity of the source electrode SD1. It is enough for the first electrode layer ITO1 to have only a function of electrically being connected with the second electrode layer ITO2 which is formed over the color filter layer CF. Accordingly, in this embodiment, different from the previous respective embodiments in which the first electrode layer ITO1 is formed covering the substantially whole region of the pixel region, the first electrode layer ITO1 is formed only on the necessary portion.

The opening portion CFH formed in the color filter layer CF is formed in alignment with the first electrode layer ITO1. Then, the second electrode layer ITO2 which constitutes the pixel electrode formed over the color filter layer CF is electrically connected with the first electrode layer ITO1 at a portion indicated by reference symbol COT in the drawing.

According to this embodiment, since the area of the first electrode layer ITO1 is reduced to a necessary minimum, the transmissivity of the pixel can be enhanced. Other advantages are equal to those of the previous embodiments and hence, their repeated explanation is omitted.

Figure 12:
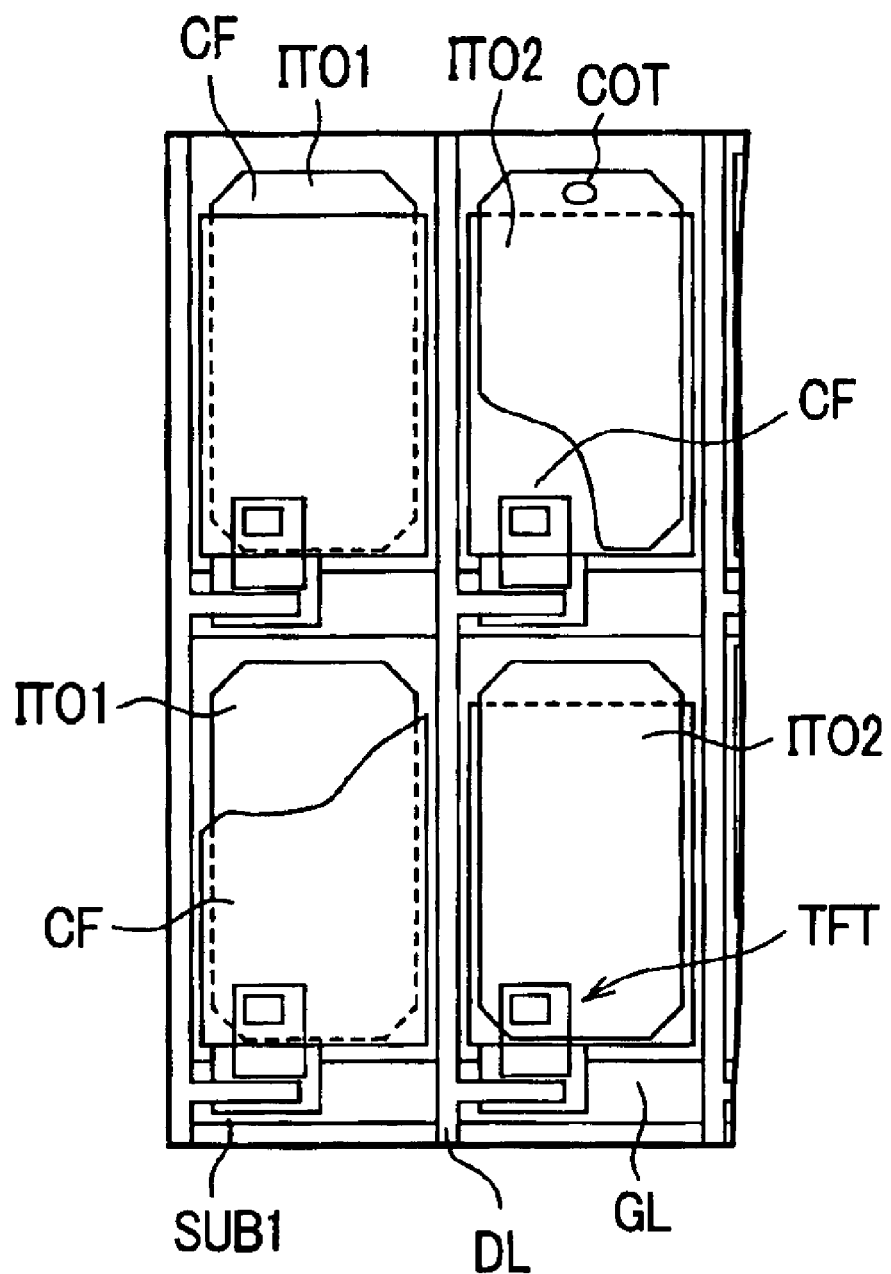
FIG. 12 is a plan view of pixel portions for explaining the fourth embodiment of the present invention.

FIG. 12 is a plan view of a pixel portion for explaining the fourth embodiment of the present invention. In this embodiment, a portion of the color filter layer CF which is formed over the first electrode layer ITO1 in the first embodiment, for example, is applied by retracting such a portion from an end periphery of the first electrode layer ITO1. BY forming the second electrode layer ITO2 over the color filter layer CF such that the second electrode layer ITO2 is formed over the substantially whole area of the pixel region, the second electrode layer ITO2 is electrically connected with the first electrode layer ITO1 which is exposed by the above mentioned retraction of the color filter layer CF. This connecting portion is indicated by reference symbol COT. Advantages obtained by this embodiment are substantially equal to those obtained by the first embodiment.

Figure 13:
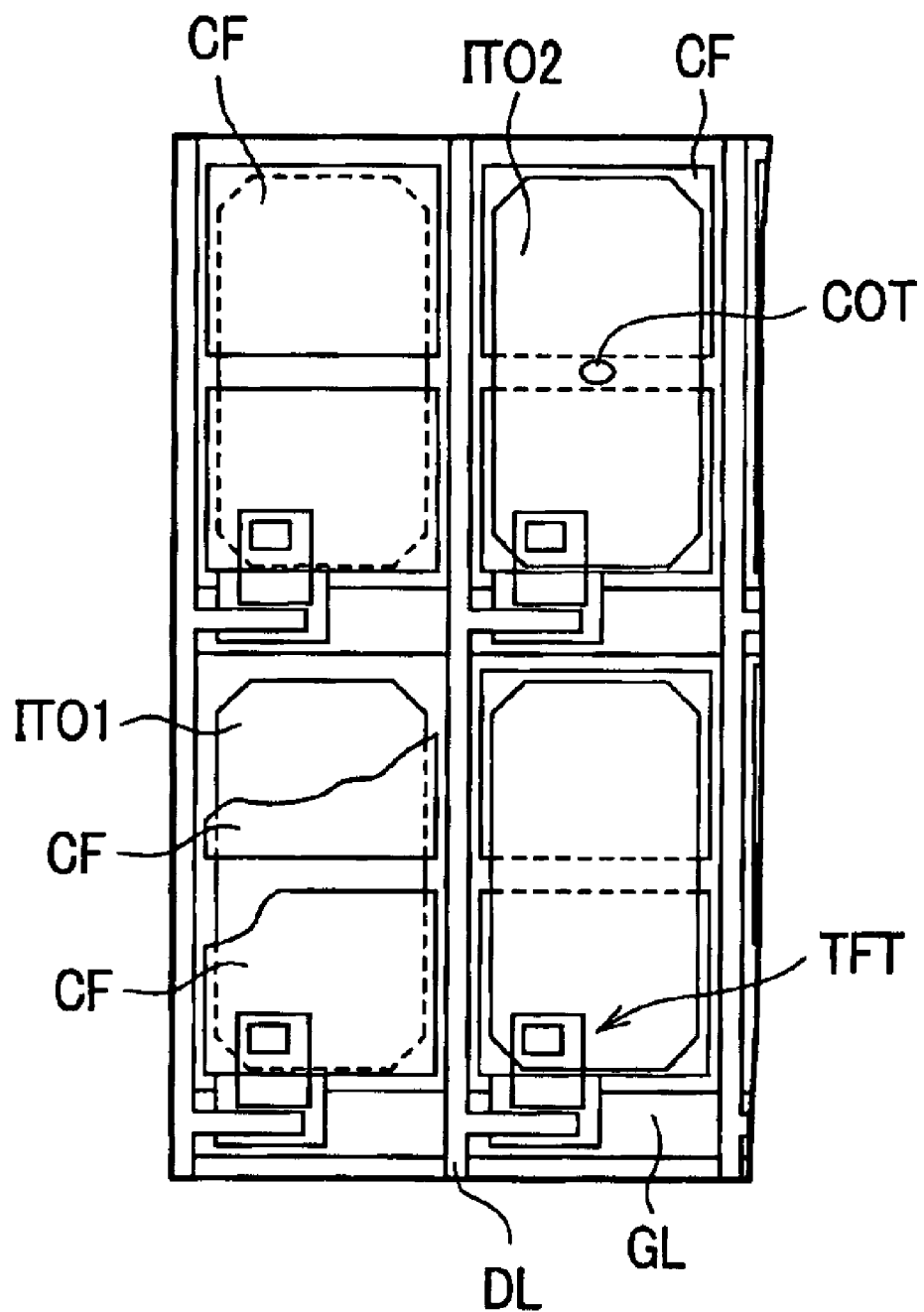
FIG. 13 is a plan view of pixel portions for explaining the fifth embodiment of the present invention.

FIG. 13 is a plan view of a pixel portion similar to the pixel portion shown in FIG. 12 for explaining the fifth embodiment of the present invention. In this embodiment, for example, the color filter layer CF which is formed over the first electrode layer ITO1 in the first embodiment is divided within the region of the first electrode layer ITO1 thus forming an exposing portion which exposes the color filter layer CF. Since the second electrode layer ITO2 is formed over the color filter layer CF such that the second electrode layer ITO2 is formed over the substantially whole area of the pixel region, the second electrode layer ITO2 is electrically connected with the first electrode layer ITO1 exposed by the above mentioned division of the color filter layer CF within the pixel region. The connecting portion is indicated by the reference symbol COT. Here, the division of the color filter layer CF is not limited to the direction parallel to the extending direction of the gate line GL as shown in FIG. 13. That is, the division of the color filter layer CF may be performed in the direction parallel to the drain line D1, or in the direction non-parallel to the drain line DL. Alternatively, these divisions may be combined such that the number of division becomes 3 or more. Advantages of this embodiment are equal to those of the first embodiment and the like.

Figure 14:
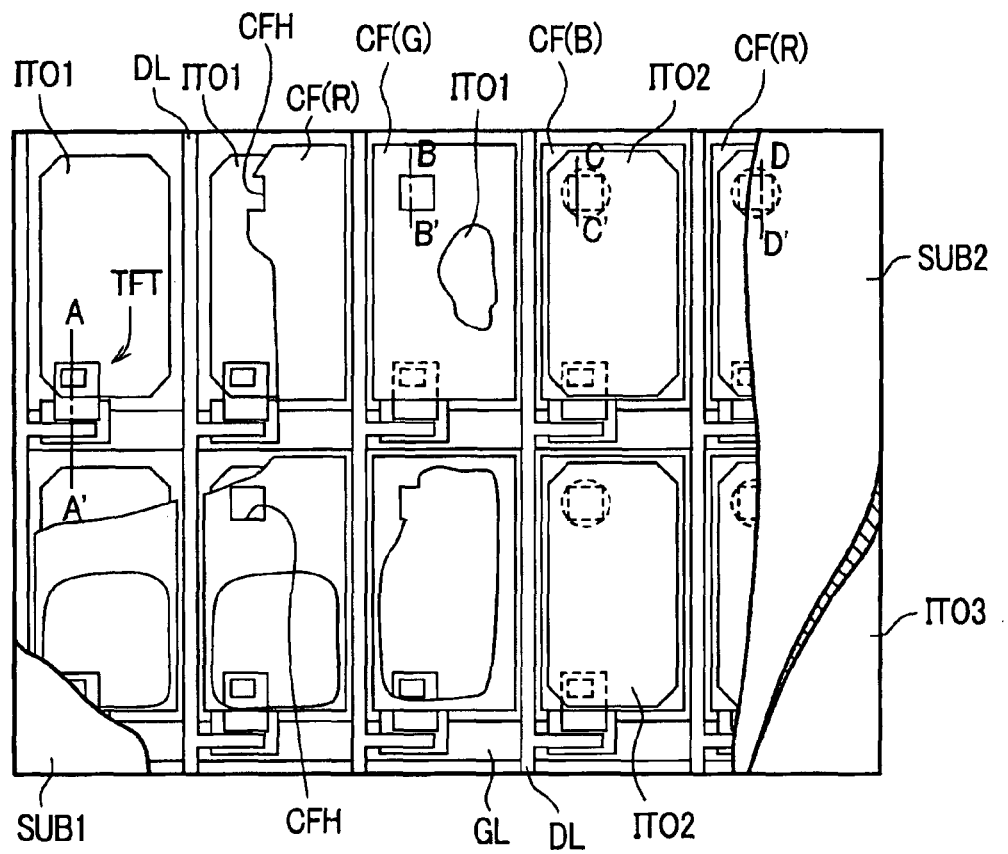
FIG. 14 is a plan view of pixel portions for explaining the sixth embodiment of the present invention.

FIG. 14 is a plan view of a pixel portion for explaining the sixth embodiment of the present invention. To facilitate the understanding of the present invention, the liquid crystal display device is shown with portions of respective constitutional layers broken or cut away. Further, FIG. 15 to FIG. 18 are cross-sectional views respectively taken along a line A–A', a line B–B', a line C–C' and a line D–D' in FIG. 14. This embodiment is characterized by providing spacers to the first embodiment of the present invention which is explained in conjunction with FIG. 1, for example. Usually, to hold a gap defined between the active matrix substrate SUB1 and the counter substrate SUB2 at a given value, the spacers are interposed between these substrates. In this embodiment, these spacers are constituted of so-called columnar spacers SP which are fixed to the active matrix substrate SUB1. These columnar spacers SP are formed over the second electrode layer ITO2 and right over the opening portions CFH formed in the color filter layers CF.

Figure 15:
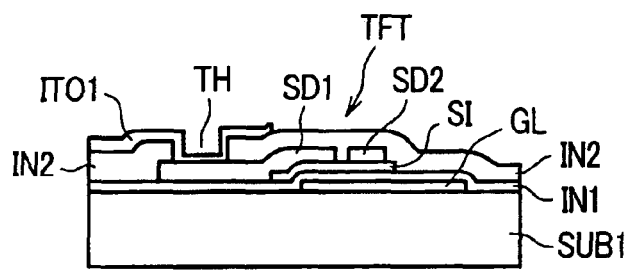
FIG. 15 is a cross-sectional view taken along a line A–A' in FIG. 14.
Figure 16:
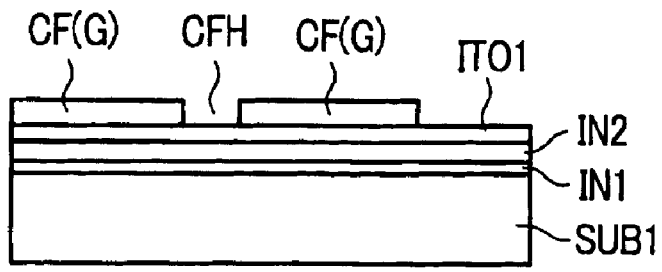
FIG. 16 is a cross-sectional view taken along a line B–B' in FIG. 14.
Figure 17:
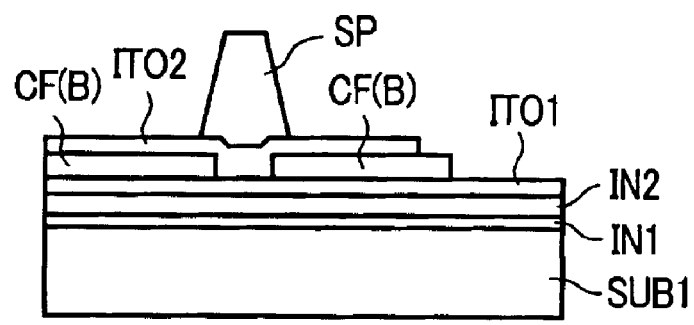
FIG. 17 is a cross-sectional view taken along a line C–C' in FIG. 14.
Figure 18:
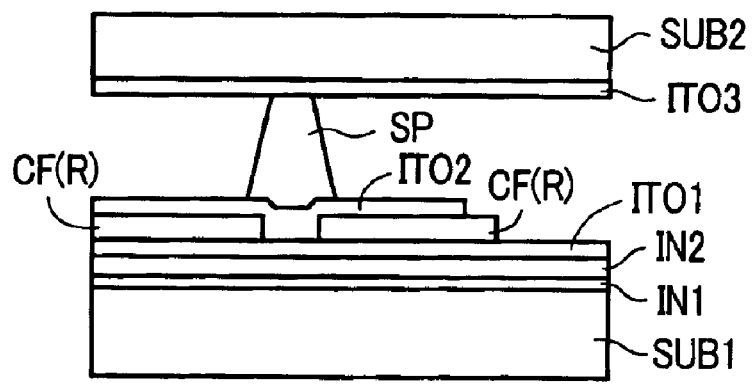
FIG. 18 is a cross-sectional view taken along a line D–D' in FIG. 14.

Up to steps shown in FIG. 15 and FIG. 16, respective layers are formed by a process similar to the process of the previous embodiment. Thereafter, as shown in FIG. 17, the columnar spacers SP are formed in the opening portions CFH of the color filter layers CF using a photolithography technique or the like. Here, when the columnar spacers SP are formed of a light shielding material, although the numerical aperture is lowered, leaking of light from the opening portion CFH can be suppressed and hence, the contrast can be enhanced. Here, in place of the columnar spacers, granular spacers (spacer beads) may be provided. Although the spacer beads can be scattered by spraying, there exist a large probability that the spacer beads are arranged in the opening portions CFH of the color filter layers CF having recessed portions. To use the spacer beads, since the spacer beads are scattered at random in the inside of the pixel region, it is desirable to use transparent beads made of glass or plastic.

Figure 19:
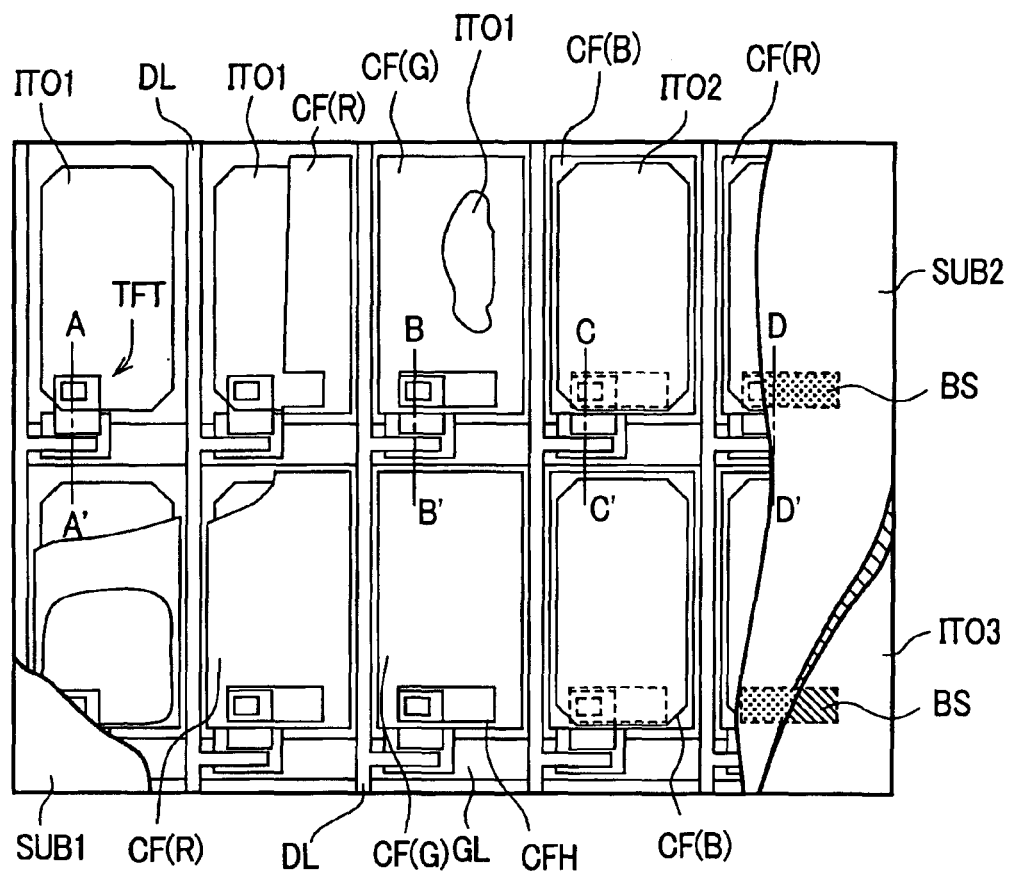
FIG. 19 is a plan view of pixel portions for explaining the seventh embodiment of the present invention.

FIG. 19 is a plan view of a pixel portion for explaining the seventh embodiment of the present invention. To facilitate the understanding of the present invention, the liquid crystal display device is shown with portions of respective constitutional layers broken or cut away. Further, FIG. 20 to FIG. 23 are cross-sectional views respectively taken along a line A–A', a line B–B', a line C–C' and a line D–D' in FIG. 19. This embodiment is characterized by using an active matrix substrate SUB1 which corresponds to that of the second embodiment of the present invention explained in conjunction with FIG. 6 and by providing light shielding films BS to portions of the color filter layers CF corresponding to opening portions CFH in the counter substrate SUB2.

Figure 8:
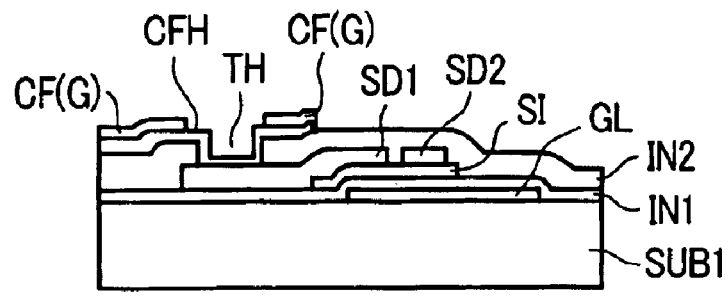
FIG. 8 is a cross-sectional view taken along a line B–B' in FIG. 6.
Figure 9:
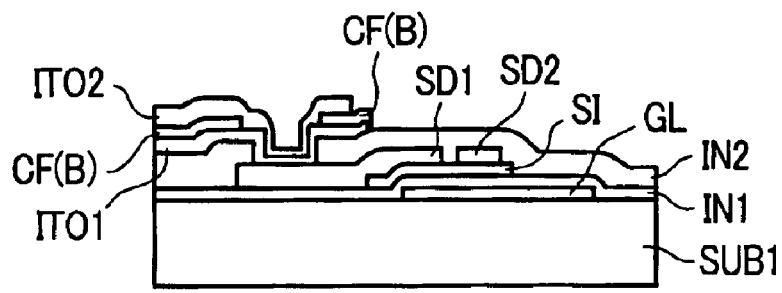
FIG. 9 is a cross-sectional view taken along a line C–C' in FIG. 6.
Figure 10:
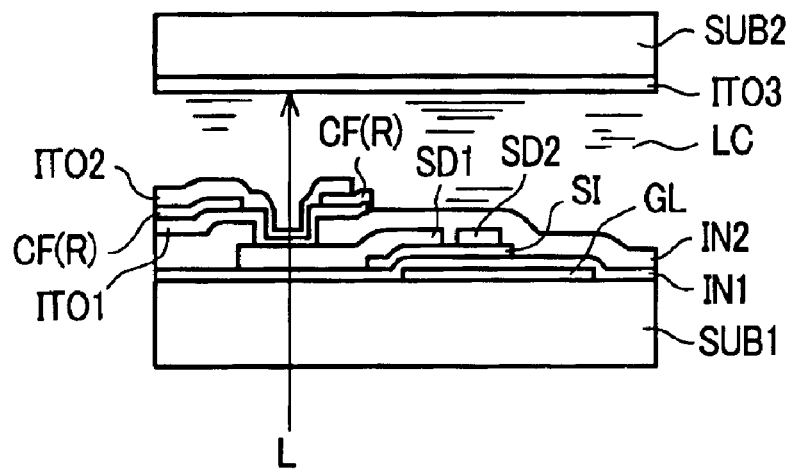
FIG. 10 is a cross-sectional view taken along a line D–D' in FIG. 6.
Figure 20:
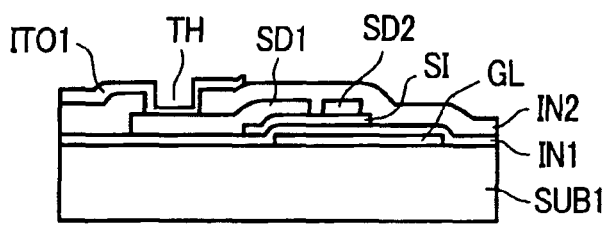
FIG. 20 is a cross-sectional view taken along a line A–A' in FIG. 19.
Figure 21:
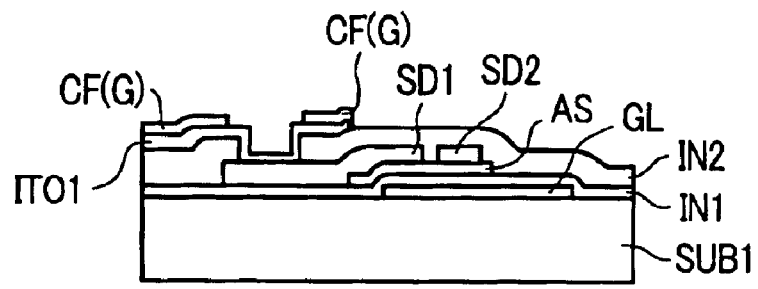
FIG. 21 is a cross-sectional view taken along a line B–B' in FIG. 19.
Figure 22:
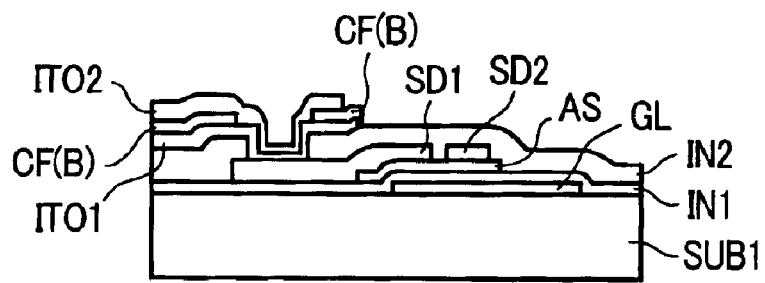
FIG. 22 is a cross-sectional view taken along a line C–C' in FIG. 19.
Figure 23:
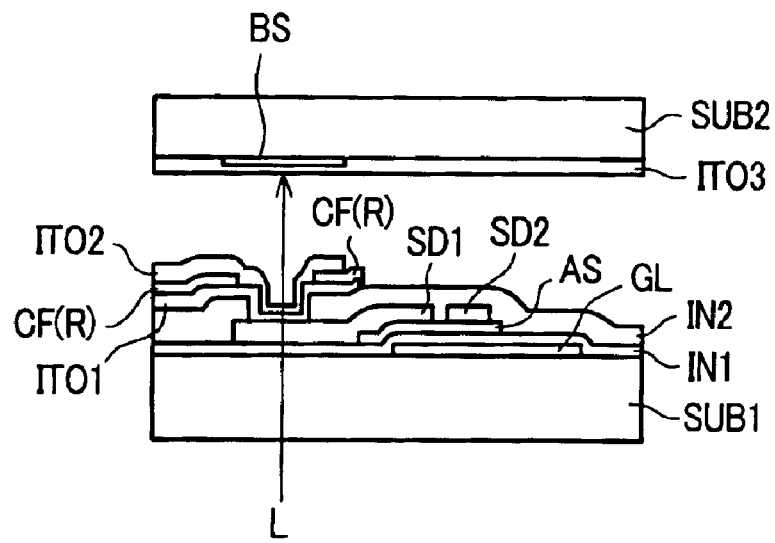
FIG. 23 is a cross-sectional view taken along a line D–D' in FIG. 19.

That is, FIG. 20 to FIG. 22 are similar to FIG. 7 to FIG. 9 and the light shielding films BS are formed over the counter substrate SUB2 shown in FIG. 23. The light shielding films BS are positioned right over the connecting portions between the first electrode layer ITO1 and the second electrode layer ITO2 which constitute opening portions CFH of the color filter layers CF shown in FIG. 19. Although it is preferable to set the size of the light shielding films BS equal to the size of the opening portions CFH of the color filter layers CF, the size of the light shielding films BS may be slightly larger or smaller than the size of the opening portions CFH of the color filter layers CF.

According to this embodiment, although the numerical aperture of the pixel is slightly lowered, lowering of hue can be suppressed by interrupting the transmitting light L which passes the opening portions CFH and hence, the contrast can be enhanced whereby this embodiment is suitable for the image display device of high definition. Other advantages of this embodiment are equal to those of the second embodiment and the like.

Figure 24:
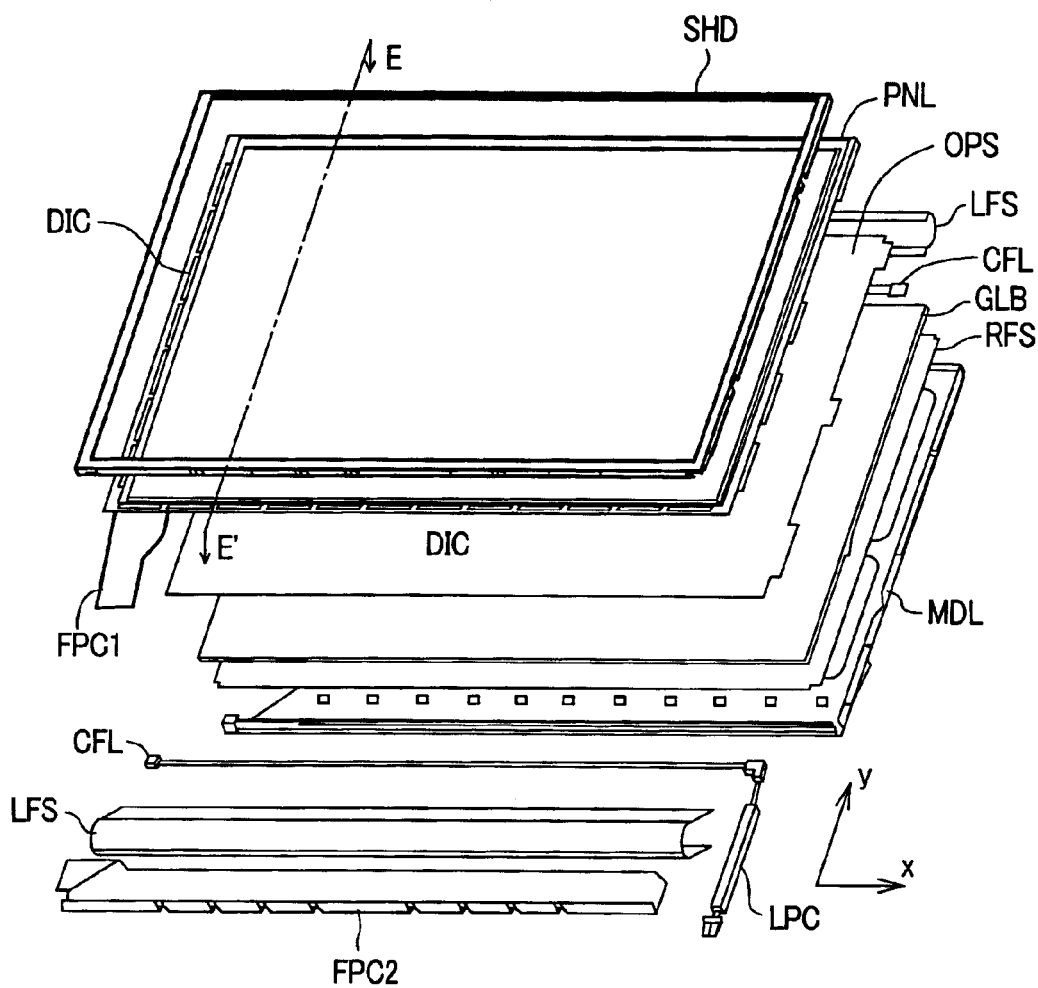
FIG. 24 is a developed perspective view for explaining one example of the overall constitution of the liquid crystal display device according to the present invention.
Figure 25:
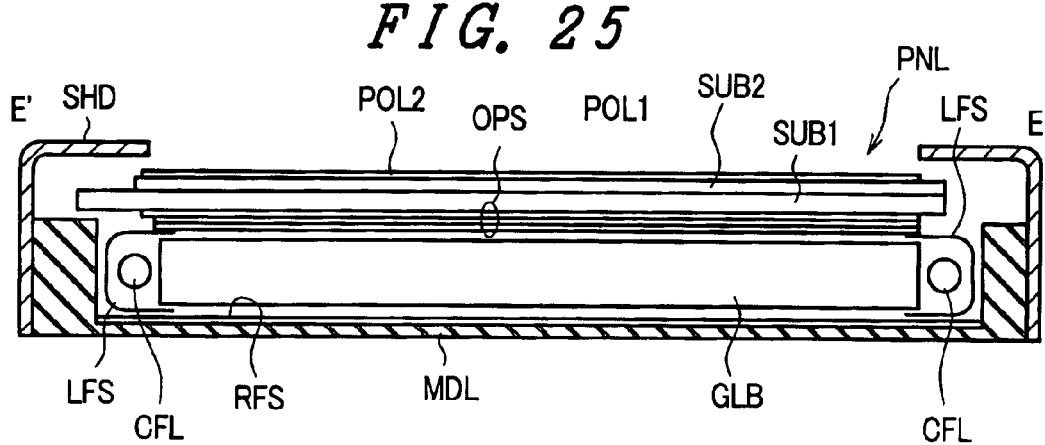
FIG. 25 is a cross-sectional view taken along a line E–E' in FIG. 24.

FIG. 24 is a developed perspective view for explaining one example of the whole constitution of the liquid crystal display device according to the present invention. Further, FIG. 25 is a cross-sectional view taken at a position corresponding to a line E–E' in FIG. 24. In FIG. 24, reference symbol PNL indicates a liquid crystal panel which is constituted by adhering polarizers (not shown in the drawings) to front and back surfaces of the composite structure formed by laminating the active matrix SUB1 and the counter substrate SUB2 explained in the above-mentioned embodiment. Further, on the periphery of the liquid crystal panel PNL, a drive circuit chip DIC for supplying display data and scanning signals to the thin film transistors which constitute pixels is mounted.

Further, reference symbol OPS indicates an optical sheet formed of a prism sheet and a diffusion sheet, GLB indicates a light guide plate, RFS indicates a reflection sheet, MDL indicates a molded frame, SHD indicates a shield frame, CFL indicates a cold cathode fluorescent lamp which constitutes a backlight together with the light guide plate GLB, and RFS indicates a reflection plate. Further, reference symbols FPC1, FPC2 are flexible printed circuit board for supplying data and timing signals for display to the drive circuit chip DIC and the like, and LPC indicates a lamp cable.

The light guide plate GLB is arranged inside the molded frame MDL and the reflection plate RFS is disposed below the light guide plate GLB. The optical sheet OPS formed of the prism sheet and the diffusion sheet is overlapped to the liquid crystal panel PNL side of the light guide plate GLB, and they are accommodated in the molded frame MDL. Further, the cold cathode fluorescent lamps CFL are arranged along both side peripheries of the light guide plate GLB.

Here, in FIG. 25, the drive circuit chip DIC, flexible printed circuit board FPC1, FPC2 and the like are omitted from the drawing. In the liquid crystal display device having such a constitution, the liquid crystal panel PNL is illuminated by the backlight constituted of the light guide plate GLB, the cold cathode fluorescent lamps CFL, the lamp refection sheet LFS and the like and visualizes electronic latent images formed on the liquid crystal panel PNL.

Figure 26:
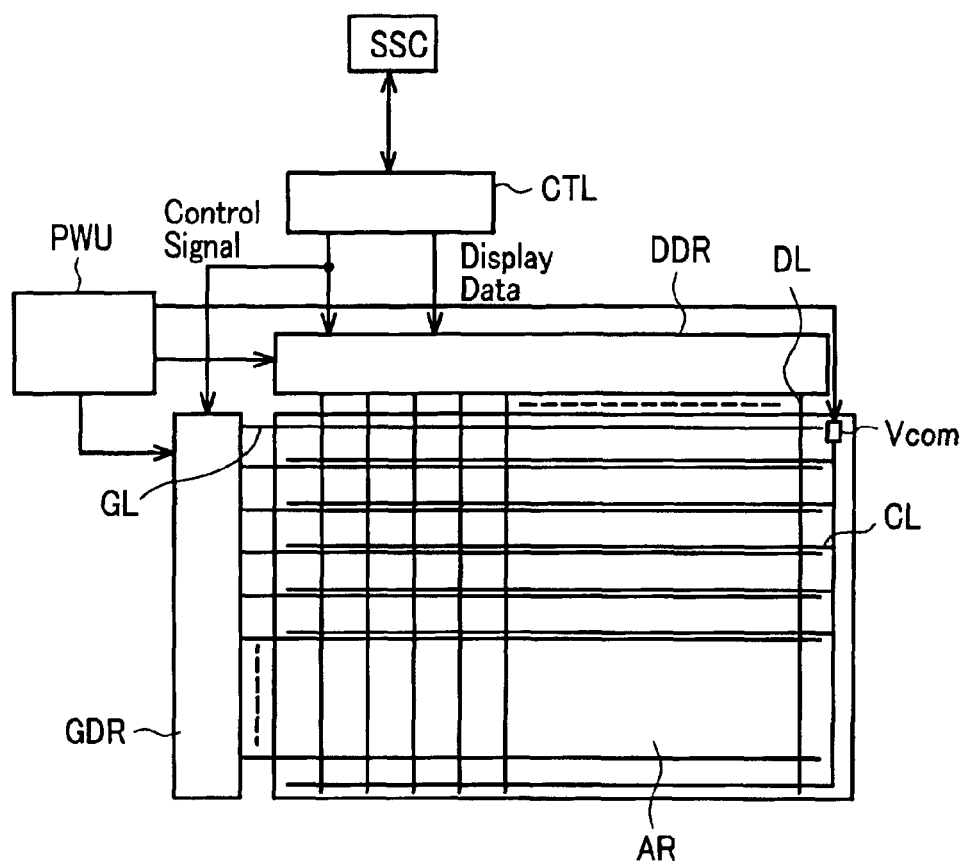
FIG. 26 is a block diagram for briefly explaining the circuit constitution of the liquid crystal display device which constitutes the liquid crystal display device of the present invention.

FIG. 26 is a block diagram for briefly explaining the circuit constitution of a liquid crystal display device which constitutes the liquid crystal display device of the present invention. In the drawing, reference symbol AR indicates an effective display region of a liquid crystal panel. Within this effective display region AR, on the inner surface of the above-mentioned first substrate SUB1, the gate lines (scanning lines) GL, the drain lines (data lines) GL, the common electrode lines CL, the thin film transistors TFT, the color filter layers CF, the pixel electrodes (ITO2) and the like are formed. The thin film transistors TF1 for selecting pixels are formed at crossing portions of the scanning lines GL and the data lines DL (not shown in the drawing). The common electrode lines CL are served for supplying a common potential to common electrodes formed on the inner surface of the above-mentioned second substrate (counter substrate SUB2) and are connected from the active matrix substrate SUB1 side to the counter substrate SUB2 side through terminals Vcom.

The scanning lines GL are driven by a scanning circuit GDR and display data are supplied to the data lines DL from a data line drive circuit DDR. A controller CTL generates control signals such as display data, timing signals and the like in response to display signals inputted from an external signal source SSC. The display data is supplied to the data line drive circuit DDR and the control signals are applied to the scanning circuit GDR. A power source circuit PWU generates various voltages necessary for the liquid crystal display device.

Figure 27:
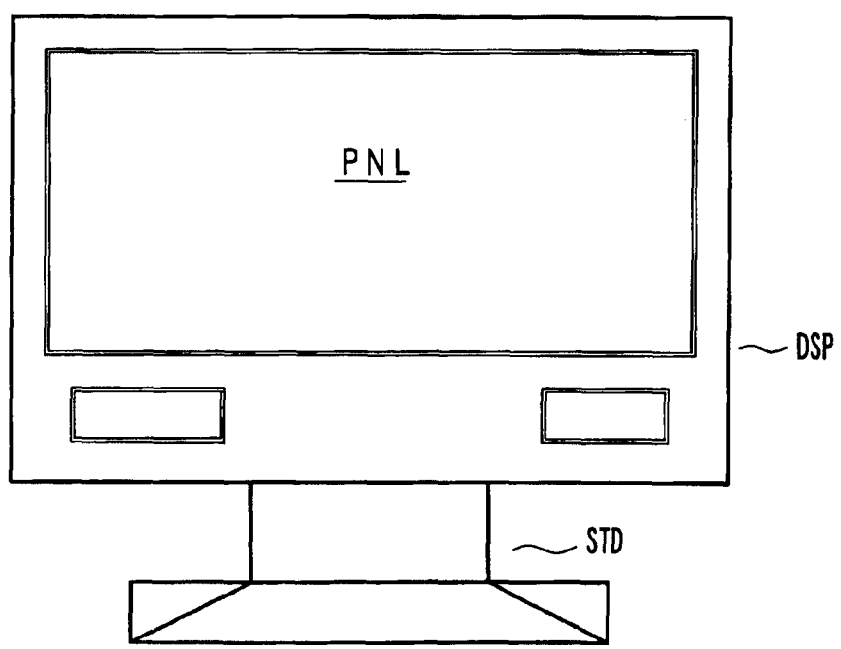
FIG. 27 is an appearance view of a television receiver set which constitutes one example of an electronic equipment to which the liquid crystal display device of the present invention is applied.

FIG. 27 is an appearance view of a television receiver set which is one example of an electronic equipment to which the liquid crystal display device of the present invention is applied. The television receiver set is constituted of a display part DSP and a standard part STD and a liquid crystal display device having a liquid crystal panel PNL with a relatively large sized screen is mounted on the display part DSP. An effective display region of the liquid crystal panel PNL which constitutes the screen of the liquid crystal display device is exposed on the display part. By mounting the liquid crystal display device of the present invention on the display part of the television receiver set, an image display device of high quality and high reliability can be realized.

Here, it is needless to say that the present invention is not limited to the liquid crystal display device of the above-mentioned embodiments which use the side-edge type backlight. That is, the present invention is also applicable in the same manner to a so-called direct backlight type liquid crystal display device which directly arranges a plurality of cold cathode fluorescent lamps on a back surface of the liquid crystal display device or a liquid crystal display device which is provided with an auxiliary illumination device such as a backlight, a front light or the like, or an electronic terminal such as a mobile telephone which is not provided with an auxiliary illumination device.

As has been explained heretofore, according to the present invention, it is possible to provide the high-quality liquid crystal display device using the color-filter-integral-type active matrix substrate without changing the manufacturing process of the conventional color-filter-separation type active matrix substrate.

What is claimed is:

1. A liquid crystal display device comprising a liquid crystal panel, the liquid crystal panel comprising:
   a first substrate on which a plurality of pixel regions each including a pixel electrode, an active element corresponding to the pixel electrode and a color filter layer are arranged in a matrix array;
   a second substrate which forms common electrodes thereon, each common electrode generating an electric field between the common electrode and the pixel electrode; and
   a liquid crystal layer formed between the first substrate and the second substrate, wherein
   a first electrode layer which is formed of a conductive thin film and is electrically connected to a drive output terminal of the active element is provided to each pixel region of the first substrate, an opening portion is formed in a portion of the color filter layer in each pixel region of the first substrate, the opening portion is overlapped with the first electrode layer at an area except for the drive output terminal of the active element, and a second electrode layer which constitutes the pixel electrode above the color filter layer and is electrically connected to the first electrode layer through the opening portion is formed.

2. A liquid crystal display device according to claim 1, wherein the first electrode layer is formed over a substantially whole area of the pixel region and the second electrode layer covers the color filter with an area equal to an area of the first electrode layer.

3. A liquid crystal display device according to claim 1, wherein the opening portion is formed at a position away from a position where the drive output terminal of the active element is formed.

4. A liquid crystal display device according to claim 1, wherein the first electrode layer is arranged in the vicinity of a position where the drive output terminal of the active element is formed and the opening portion of the color filter layer is arranged in the vicinity of a position where the drive output terminal of the active element is formed.

5. A liquid crystal display device comprising a liquid crystal panel, the liquid crystal panel comprising:

a first substrate on which a plurality of pixel regions each including a pixel electrode, an active element driving the pixel electrode and a color filter layer formed corresponding to the active element are arranged in a matrix array;

a second substrate which forms common electrodes thereon, each common electrode generating an electric field between the common electrode and the pixel electrode; and a liquid crystal layer sandwiched between the first substrate and the second substrate, wherein a first electrode layer which is formed of a conductive thin film and is electrically connected to a drive output terminal of the active element is provided to the pixel region of the first substrate;

the color filter layer is formed such that an exposing portion which exposes a portion of the first electrode layer is formed over the first electrode layer within the pixel region, and a second electrode layer which constitutes the pixel electrode over the color filter layer and is electrically connected with the first electrode layer at the exposing portion except for the drive output terminal of the active element is formed.

6. A liquid crystal display device according to claim 5, wherein the color filter layer is cut off at some end peripheries thereof to be retracted from the end periphery of the first electrode layer.

7. A liquid crystal display device according to claim 5, wherein the color filter layer has a dividing portion thereof which divides the color filter layer into at least two sections to expose the first electrode layer within the pixel region, and the first electrode layer and the second electrode layer are electrically connected at the dividing portion to form the pixel electrode.

8. A liquid crystal display device according to claim 7, wherein the dividing portion is formed in one portion substantially at the center of the pixel region.

9. A liquid crystal display device according to claim 7, wherein the light shielding layer is provided at a position corresponding to the dividing portion of the color filter layer.

10. A liquid crystal display device according to claim 5, wherein the second electrode layer and the common electrode of the second substrate are bridged with spacers which define a gap formed between the first substrate and the second substrate. light shielding layer is provided at a position corresponding to the dividing portion of the color filter layer.

11. A liquid crystal display device according to claim 10, wherein the spacer is formed at a portion where the first electrode layer and the second electrode layer are electrically connected with each other.

12. A liquid crystal display device according to claim 5, wherein a light shielding layer is formed at a portion of the second substrate which faces a portion where the first electrode layer and the second electrode layer are electrically connected to each other.

13. A liquid crystal display device according to claim 12, wherein the light shielding layer is provided at a position which corresponds to the exposing portion of the first electrode layer.

* * * * *